US012649173B2

(12) United States Patent
Li et al.

(10) Patent No.: US 12,649,173 B2
(45) Date of Patent: Jun. 9, 2026

(54) CONTAINER TESTING EQUIPMENT

(71) Applicant: CHEMLEX PTE. LTD., Singapore (SG)

(72) Inventors: Xiangxiang Li, Singapore (SG); Chao Lu, Singapore (SG); Yanqing Yu, Singapore (SG)

(73) Assignee: CHEMLEX PTE. LTD., Singapore (SG)

( * ) Notice: Subject to any disclaimer, the term of this patent is extended or adjusted under 35 U.S.C. 154(b) by 0 days.

(21) Appl. No.: 18/955,979

(22) Filed: Nov. 22, 2024

(65) Prior Publication Data

US 2026/0145206 A1     May 28, 2026

(51) Int. Cl.
B07C 5/07       (2006.01)
B07C 5/36       (2006.01)
G01N 35/04      (2006.01)

(52) U.S. Cl.
CPC .................. B07C 5/07 (2013.01); B07C 5/36 (2013.01); G01N 35/04 (2013.01)

(58) Field of Classification Search
CPC ........... B07C 5/07; B07C 5/083; B07C 5/124
USPC ................... 209/533; 33/545, 558
See application file for complete search history.

(56) References Cited

U.S. PATENT DOCUMENTS 7,409,977 B2     8/2008   Rice et al.
2003/0027343 A1  2/2003   Schabbach et al.

FOREIGN PATENT DOCUMENTS

| CN | 201600125 U | 10/2010 |
| CN | 103760372 A | 4/2014 |
| CN | 106643446 A | 5/2017 |
| CN | 210701223 U | 6/2020 |
| CN | 111515142 A | 8/2020 |
| CN | 114146925 A | 3/2022 |
| CN | 217890648 U | 11/2022 |
| CN | 118081128 A | 5/2024 |

(Continued)

OTHER PUBLICATIONS

Zuo; Lili, "A Mobile Shelf-Type Automatic Sorting Device for Logistics Goods" (English Translation), Mar. 8, 2022, worldwide. espacenet.com (Year: 2022).*

(Continued)

*Primary Examiner* — Michael McCullough
*Assistant Examiner* — Molly K Devine
(74) *Attorney, Agent, or Firm* — Kilpatrick Townsend & Stockton LLP

(57)     ABSTRACT

The present disclosure provides a container testing equipment, specifically related to the field of analysis and testing, which includes: a conveying mechanism, and a rejection mechanism, a testing mechanism, and a driving mechanism provided on the conveying mechanism; the conveying mechanism for conveying containers to be tested; the rejection mechanism includes a container pushing device and a container holding device disposed opposite each other on both sides of the conveying mechanism, and the container pushing device is used to push the containers to be tested on the conveying mechanism into the container holding device when the working circuit is on. The present disclosure improves the efficiency and accuracy of container testing and greatly reduces the possibility of damage to the analyzing instrument due to over-high containers.

11 Claims, 6 Drawing Sheets

(56)         References Cited

FOREIGN PATENT DOCUMENTS

JP          H06213610   A       8/1994
WO          1993009885  A1      5/1993

OTHER PUBLICATIONS

Huang; Long, "Flatness Detection Fixture and Flatness Detection Method" (English Translation), May 10, 2017, worldwide.espacenet. com (Year: 2017).*
Zhang; Zhaozhe, "An Automatic Logistics Sorting Platform" (English Translation), Jun. 9, 2020, worldwide.espacenet.com (Year: 2020).*
International Search Report and Written Opinion of ISA received in the counterpart international application PCT/IB2025/061222, mailed on Feb. 9, 2026.

* cited by examiner

CONTAINER TESTING EQUIPMENT

FIELD

The present disclosure relates to the field of analysis and testing, and in particular to a container testing equipment.

BACKGROUND OF THE DISCLOSURE

Medicinal synthesis experiments are an important part of drug research and development. In medicinal synthesis experiments, containers that have been processed in the previous step need to be sent to the next step. For example, containers that have been treated in a reaction can be assembled with lids or combined containers can be assembled and sent to the next automated processing equipment. At this time, the height of the assembled container needs to be tested first. If it is over-high, when the container is loaded into the next automated equipment for the next process, it will cause damage to the automated equipment.

In the prior art, the height testing of the container relies on manual labor, specifically, the manual labor checks whether the container to be tested is over-high by means of visual inspection. This method has great limitations, and when the human eye becomes fatigued, it may lead to a misjudgment, which may cause damage to the automated equipment; and this method is less efficient and cannot be processed in batch.

BRIEF SUMMARY OF THE DISCLOSURE

In order to be able to solve at least one of the above mentioned drawbacks of the prior art, the present disclosure provides a container testing equipment, comprising:

a conveying mechanism, used for conveying the container to be tested in the first direction;

a rejection mechanism, arranged on the conveying mechanism; the rejection mechanism comprises a container pushing device and a container holding device; the container pushing device and the container holding device are arranged opposite each other on both sides of the conveying mechanism in the second direction; the second direction intersects the first direction; the container pushing device is used to push the container to be tested on the conveying mechanism into the container holding device when the working circuit is in conductive state;

a testing mechanism, arranged on the conveying mechanism; the testing mechanism comprises a first conductive element, which is arranged in series in the working circuit of the container pushing device, and is used to move the testing mechanism between a first position and a second position when the testing mechanism is in a predetermined position; the first position of the testing mechanism matches the standard height of the container to be tested when in the predetermined position; the distance between the first position and the conveying mechanism in the vertical direction is less than the distance between the second position and the conveying mechanism in the vertical direction; the first position is used to disconnect the first conductive element from the working circuit so that the working circuit is in a non-conductive state; the second position is used to connect the first conductive element to the working circuit so that the working circuit is in a conductive state;

a driving mechanism, arranged on the conveying mechanism; the driving mechanism is used to drive the testing mechanism to the predetermined position.

Optionally, the testing mechanism further comprises a second conductive element, which is arranged opposite the first conductive element in the vertical direction, the first conductive element is arranged close to the conveying mechanism in relation to the second conductive element, and the second conductive element is arranged in series on the working circuit; the second conductive element is used to separate from the first conductive element when the first conductive element is in the first position, so that the first conductive element is disconnected from the working circuit; and the second conductive element is also used to contact the first conductive element when the first conductive element is in the second position, so that the first conductive element is connected to the working circuit.

Optionally, the testing mechanism further comprises a first insulating board and a second insulating board disposed opposite to each other in a vertical direction, the first conductive element is disposed on the side of the first insulating board close to the second insulating board, the second conductive element is disposed on the side of the second insulating board close to the first insulating board, and the first insulating board is slidably connected to the second insulating board.

Optionally, the second insulating board comprises a guide groove arranged in a vertical direction, and the first insulating board is engaged with the guide groove to allow the first insulating board to slide along the guide groove.

Optionally, at least one conductive element of the first conductive element and the second conductive element is an elastically conductive element, the elastically conductive element is used to deform in the vertical direction.

Optionally, the second conductive element is an elastic conductive element.

Optionally, the second conductive element comprises at least one probe; the second insulating board is provided with a probe holder corresponding to the probe, and the probe is fixed to the probe holder in a vertical direction so that one end of the probe faces the first conductive element.

Optionally, the first conductive element is a conductive board, the probes are provided in a plurality, the distribution of a plurality of the probes corresponding to the probe holders on the second insulating board matches the shape of the conductive board, and the distance between each of the probes and the first conductive element in the vertical direction is consistent.

Optionally, the container testing equipment further comprises a bracket, the bracket is provided on the conveying mechanism, the second insulating board for sliding in a vertical direction relative to the bracket.

Optionally, the driving mechanism comprises a first sensor and a drive motor, the first sensor is electrically connected to the drive motor;

the first sensor is provided close to the testing mechanism for sending a signal to the control circuit of the drive motor when the container to be tested is detected to control the operation of the drive motor;

the drive motor is provided on the bracket, the drive motor is remote from the conveying mechanism with respect to the testing mechanism, for driving the second insulating board to slide in a vertical direction relative to the bracket.

Optionally, the second insulating board is further provided with at least one guide element; the guide element is slidably connected to the bracket, and the sliding direction of the guide element is in a vertical direction.

Optionally, the bracket is further provided with a second sensor, the at least one guide element is provided with a limit device, the second sensor is used for testing the position of the limit device in the vertical direction.

Optionally, the first insulating board is provided with a breathable structure.

Optionally, the first insulating board is provided with at least one elastic element between the first insulating board and the second insulating board, the first insulating board is provided with grooves corresponding to the elastic element, the second insulating board is provided with grooves corresponding to the elastic element, the grooves is shaped to match the shape of the elastic element; the one end of the elastic element is accommodated in a corresponding groove in the first insulating board and the other end of the elastic element is accommodated in a corresponding groove in the second insulating board.

By adopting the above technical solution, the present disclosure has the following beneficial effects:

The present disclosure provides a container testing equipment, a conveying mechanism, and a rejection mechanism, a testing mechanism, and a driving mechanism provided on the conveying mechanism; the rejection mechanism comprises a container pushing device and a container holding device, the container pushing device is used to push the container to be tested on the conveying mechanism into the container holding device when the working circuit is in a conductive state; the first conductive element of the testing mechanism is provided in series on the working circuit of the container pushing device, and the first conductive element is used to move between a first position and a second position for controlling the on/off switching of the working circuit of the container pushing device, the first position matching the standard height of the container to be tested; and the driving mechanism is used to drive the testing mechanism to a predetermined position. At work, if the container to be tested does not exceed a standard height, the first conductive element and the working circuit of the container pushing device remain disconnected, and the container to be tested continues to be conveyed by the conveying mechanism; if the container to be tested exceeds the standard height, the container to be tested provides a vertically upward thrust to the first conductive element, causing the first conductive element to be connected to the working circuit of the container pushing device, and the working circuit is conducted, and the container pushing mechanism pushes the container to be tested into the container holding device. This automatically rejects containers that exceed the standard height, improves the efficiency and accuracy of container testing, and greatly reduces the possibility of damage to analytical instruments due to over-high containers.

Other features and advantages of the present disclosure will be described in detail in the subsequent embodiment section.

BRIEF DESCRIPTION OF THE DRAWINGS

In order to illustrate more clearly the technical solution in the embodiments of the present disclosure, the following will briefly introduce the drawings to be used in the description of the embodiments, and it will be obvious that the drawings in the following description are only some of the embodiments of the present disclosure, in which the same reference marks usually represent the same parts, and for the person of ordinary skill in the Technical Field, other drawings can be obtained on the basis of the drawings, without creative labor, and other drawings can be obtained on the basis of the drawings, and other drawings can be used to illustrate the embodiments of the present disclosure. Other drawings may also be obtained from these drawings without the expenditure of creative labor.

DETAILED DESCRIPTION OF THE DISCLOSURE

The technical solutions in the present disclosure embodiments will be clearly and completely described below in conjunction with the drawings in the present disclosure embodiments. Obviously, the described embodiments are only a part of the embodiments of the present disclosure, and not all of the embodiments. All other embodiments obtained by those skilled in the art based on the embodiments in the present disclosure without creative labor fall within the scope of protection of the present disclosure.

"Embodiment" or "embodiments" used herein means a particular feature, structure or characteristic that may be included in at least one embodiment realization of the present disclosure. In the description of the present disclosure, it should be understood that the azimuth or positional relationship indicated by the terms "upper", "lower", "top" and "bottom" is based on the azimuth or positional relationship shown in the attached drawings, and is only for the convenience of describing the present disclosure and simplifying the description, and does not indicate or imply that the referred device or element must have a specific orientation, be constructed and operated in a specific orientation, so it cannot be understood as a limitation of the present disclosure. Furthermore, the terms "first" and "second" are used for descriptive purposes only and are not to be understood as indicating or implying relative importance or implicitly specifying the number of technical features indicated. Thus, a feature defined with the terms "first" and "second" may expressly or implicitly include one or more such features. Furthermore, the terms "first", "second", etc. are used to distinguish similar objects and need not be used to describe a particular order or sequence. It should be understood that the data so used may be interchanged, where appropriate, so that the embodiments of the present disclosure described herein can be embodied in an order other than those illustrated or described herein.

Figure 1:
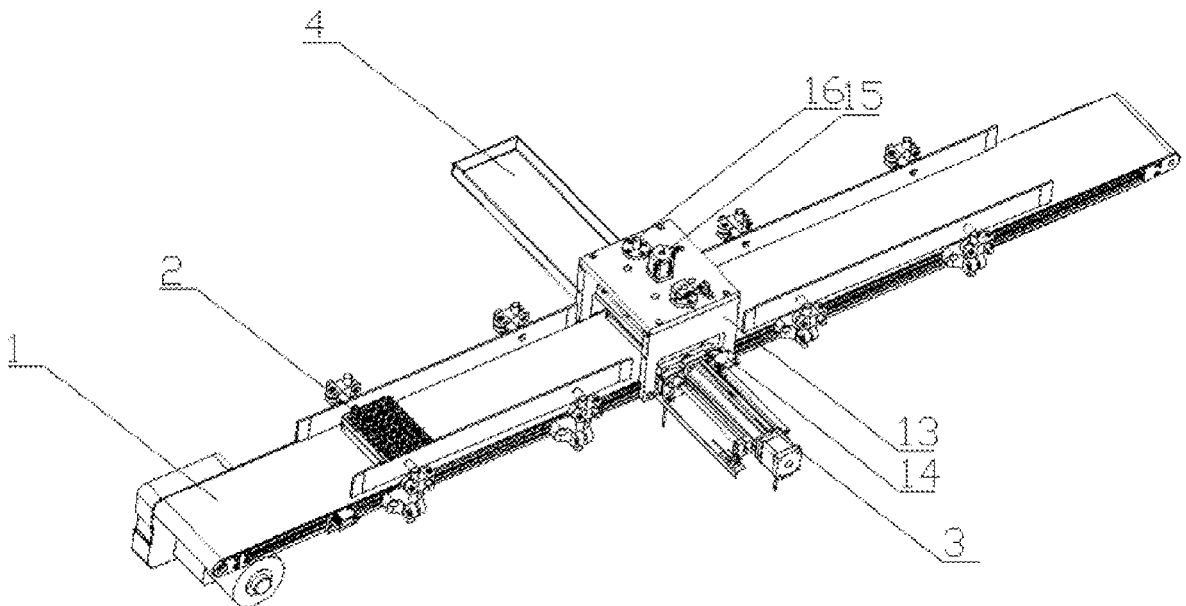
FIG. 1 is a schematic diagram of a structure of a container testing equipment provided by an embodiment of the present disclosure.
Figure 2:
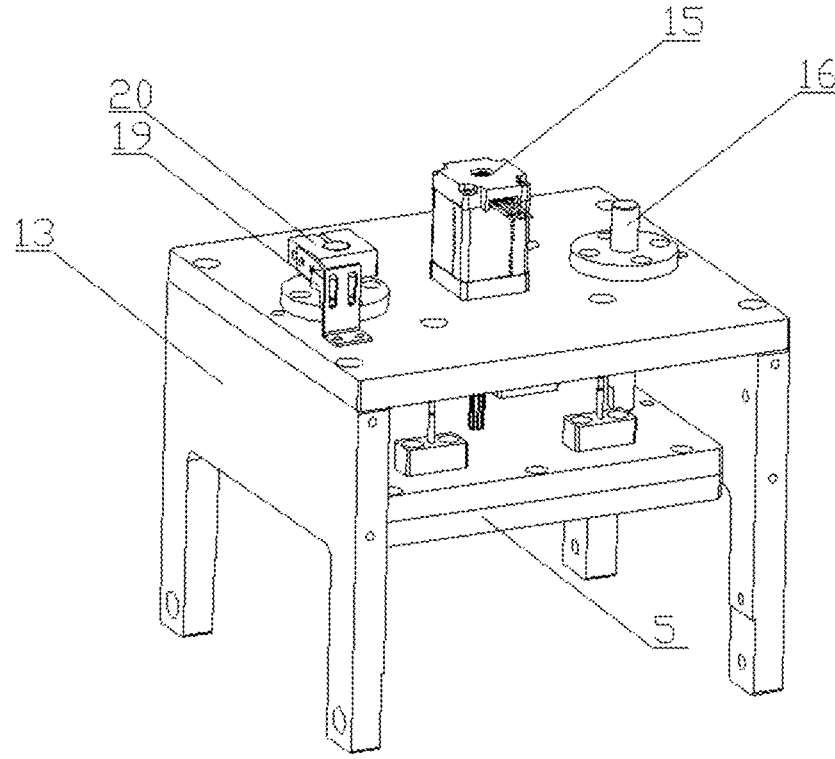
FIG. 2 is a schematic diagram of a local structure of a container testing equipment provided by an embodiment of the present disclosure.
Figure 3:
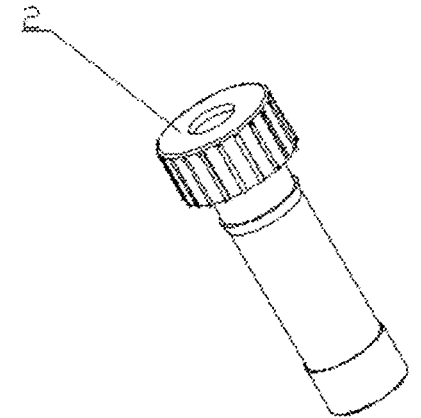
FIG. 3 is a schematic diagram of the structure of a combined container provided by an embodiment of the present disclosure.

Reference is made to FIGS. 1-2, which are shown as a schematic diagram of a structure of a container testing equipment provided by embodiments of the present disclosure, and a schematic diagram of a local structure of a container testing equipment. The present disclosure provides a container testing equipment, comprising:

A conveying mechanism 1 for conveying the container to be tested 2 in a first direction. Specifically, the conveying mechanism 1 for conveying the container to be tested 2 to the testing mechanism 5, the first direction is an arbitrary direction of horizontal. Exemplarily, the container to be tested 2 may be a combined container as shown in FIG. 3, and the combined container is formed by assembling the reaction-treated container with a lid or assembling the combined container. The conveying mechanism 1 may be provided as a drive belt structure; in some specific embodiments, the plurality of combined containers are placed in an analytical disk, the analytical disk is placed on the conveying mechanism 1, and the conveying mechanism 1 conveys the analytical disk containing the plurality of combined containers to the testing mechanism 5 for batch testing of the combined containers; wherein the width of the conveying mechanism 1 matches the size of the analytical disk.

A rejection mechanism is provided on the conveying mechanism 1; the rejection mechanism comprises a container pushing device 3 and a container holding device 4; the container pushing device 3 and the container holding device 4 are provided opposite each other on both sides of the conveying mechanism 1 along a second direction; the second direction intersects with the first direction; the container pushing device 3 is used to push the container to be tested 2 on the conveying mechanism 1 into the container holding device 4 when the working circuit is in an on-state. Specifically, the rejection mechanism is used to reject the containers to be tested 2 that exceed a standard height from the conveying mechanism 1, the standard height is the height of the combined containers when they are in a correctly combined state; the container pushing device 3 is used to push the containers to be tested 2 that exceed the standard height into the container holding device 4, waiting to be processed manually or by other testing equipment. In accordance with the conventional placement of the testing mechanism, the opening of the container holding device 4 is lower than the conveying mechanism 1, or is level with the conveying mechanism 1, or an articulation structure, such as a ramp or the like, is provided at the interface between the opening of the container holding device 4 and the conveying mechanism 1, so as to facilitate that the container to be tested 2 can be pushed into the container holding device 4 by the container pushing device 3. Exemplarily, the container holding device 4 can be provided as a hopper, the container pushing device 3 may be provided as an electric cylinder, and the electric cylinder is used as a power source, and there are various alternative solutions, including but not limited to a cylinder or a screw rod. The second direction and the first direction may intersect at different angles, and in specific embodiments, for ease of setup, the second direction is a horizontal direction perpendicular to the first direction, and the container pushing device 3 provides a pushing force in the horizontal direction perpendicular to the first direction to the container to be tested 2 that exceeds a standard height.

A testing mechanism 5 is provided on the conveying mechanism 1. Specifically, the testing mechanism 5 is used to conduct the working circuit of the container pushing device 3 in case the container to be tested 2 exceeds the standard height, so as to cause the container pushing device 3 to push the container to be tested 2 exceeding the standard height into the container holding device 4, i.e., the container to be tested 2 exceeding the standard height is to be rejected, and thus the location of the testing mechanism 5 is set in line with the location of the rejection mechanism.

The testing mechanism 5 comprises a first conductive element 6, the first conductive element 6 is provided in series on the working circuit of the container pushing device 3, the first conductive element 6 is used to move between the first position and the second position when the testing mechanism 5 is in a predetermined position; the first position matching a standard height of the container to be tested 2 when the testing mechanism 5 is in the predetermined position; the first position is in a vertical direction with the conveying mechanism 1 that is smaller than the distance between the second position and the conveying mechanism 1 in the vertical direction; the first position is used to disconnect the first conductive element 6 from the working circuit to make the working circuit in a non-conducting state; the second position is used to connect the first conductive element 6 to the working circuit to make the working circuit in a conducting state. Specifically, the first position and the second position are relative positions of the first conductive element 6 in the testing mechanism 5, and when the testing mechanism 5 is in the predetermined position, the first position matches the distance between the first position and the conveying mechanism 1 in the vertical direction and the standard height of the container to be tested 2, and thus the predetermined position is set according to the standard height of the container to be tested 2; the second position varies according to the degree of over-highness of the container to be tested 2, and thus according to the conventional placement of the testing equipment, the connection point between the working circuit of the container pushing device 3 and the first conductive element 6 above the first conductive element 6 is scalable within the range of variation of the second location; in the vertical direction, the second location is higher than the first location, and the distance between the lowest point of the second location and the first location is a negligible error allowed for the standard height. Specifically, without changing the standard height, the first location indicates a fixed height value, and the height value indicated at the lowest point of the changing range of the second location is not exactly the height value indicated by the first location, there is a certain height difference, that is to say, in the case that the first conductive element 6 is in the range indicated by this height difference, it is possible that the working circuit does not conduct, and the rejection action will not be performed. Therefore, if the degree of exceeding the standard height of the container to be tested 2 is within the error range, i.e. the first conductive element 6 has not reached the second position and is in a position between the second position and the first position, the working circuit will not be conducted and this container to be tested 2 will not be rejected. The distance between the first location or the second location and the conveying mechanism 1 in the vertical direction described in the present disclosure refers to the distance between the first location or the second location relative to the contact surface between the container to be tested 2 and the conveying mechanism 1 in the vertical direction.

In some specific embodiments, the first conductive element 6 can be arranged in the form of a plate and horizontally above the conveying mechanism 1, so that the containers to be tested 2 can be tested in a batch. Specifically, the dimensions of the first conductive element 6 match the cross-sectional area of the multiple containers to be tested 2 and the number of containers to be tested 2 that the testing mechanism 5 needs to test at a time. For example, for an analysis tray filled with combined containers, the dimensions of the first conductive element 6 match the length and width of the analysis tray, so that when the combined container in any position in the analysis tray exceeds a standard height, it can provide a vertical upward push to the first conductive element 6, and then the first conductive element 6 moves to a second position, the working circuit of the container pushing device 3 is connected; and when the analysis tray and the combined container placed therein are pushed into the container holding device 4 by the container pushing device 3, the first conductive element 6 leaves the second position and the working circuit of the container pushing device 3 is disconnected. In some specific embodiments, the container to be tested 2 may comprise an analysis tray and the combined container placed therein. Exemplarily, the analytical disk has a specification of 6*9, and accordingly, the number of combined containers placed on the analytical disk may be 54.

A drive mechanism, which is arranged on the conveying mechanism 1; the drive mechanism is used to drive the testing mechanism 5 to a preset location. Specifically, the drive mechanism is used to apply a force to the testing mechanism 5 in the vertical direction; in accordance with the conventional placement of the testing equipment, the initial position of the testing mechanism 5 is higher than the preset location, and the power output end of the drive mechanism is connected to the testing mechanism 5 to drive the testing mechanism 5 to move from the initial position to the predetermined position, and then from the predetermined position back to the initial position. In specific embodiments, the power source of the drive mechanism may be set as a motor, and there are a variety of alternative solutions, including but not limited to a cylinder, a screw rod, and an electric cylinder; according to the conventional placement of the testing equipment, the power source of the drive mechanism may be set above the testing mechanism 5, so that when the container to be tested 2 is transported to the testing mechanism 5 by the conveying mechanism 1, the driving mechanism presses the testing mechanism 5 down to a predetermined position, and the working circuit of the container pushing device 3 remains disconnected before the testing mechanism 5 reaches the initial position.

Specifically, in the present disclosure, the container pushing device 3 is used to push the container to be tested 2 on the conveying mechanism 1 into the container holding device 4 when the working circuit is in a conduction state; a first conductive element 6 of the testing mechanism 5 is provided in series with the working circuit of the container pushing device 3, and the first conductive element 6 is used to control the on/off switching of the working circuit of the container pushing device 3 when the testing mechanism 5 is located in the predetermined position. The first location matches a standard height of the container to be tested 2 when the testing mechanism 5 is located at the predetermined position; the drive mechanism is used to drive the testing mechanism 5 to the predetermined position. During operation, if the container to be tested 2 does not exceed the standard height, the first conductive element 6 remains disconnected from the working circuit of the container pushing device 3, and the container to be tested 2 continues to be conveyed by the conveying mechanism 1; if the container to be tested 2 exceeds the standard height, the container to be tested 2 provides a vertically upward thrust to the first conductive element 6, which causes the first conductive element 6 to connect with the working circuit of the container pushing device 3, and the working circuit conducts, the container pushing device 3 pushes the container to be tested 2 into the container holding device 4. Such that, it realizes automatic rejection of containers that are over-high, improving the efficiency and accuracy of container testing, and greatly reducing the possibility of damage to the analytical instrument due to over-high containers.

Figure 4:
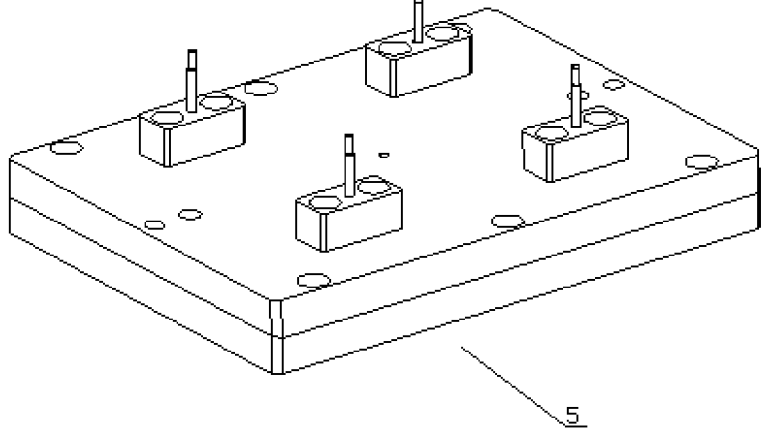
FIG. 4 is a schematic diagram of a structure of a testing mechanism provided by an embodiment of the present disclosure.
Figure 5:
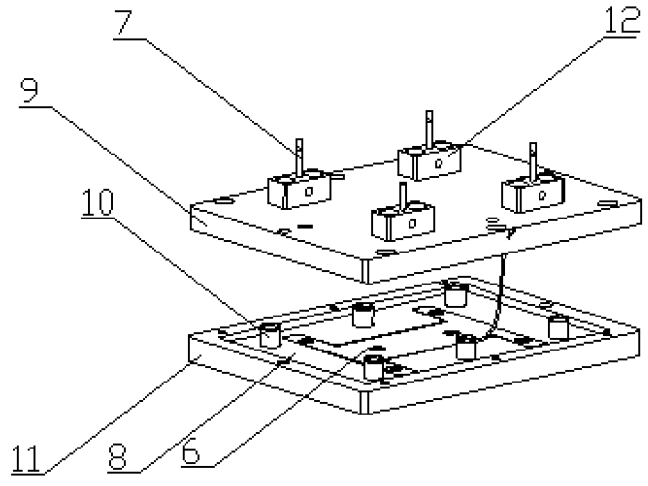
FIG. 5 is a schematic diagram of the structure of another testing mechanism provided by an embodiment of the present disclosure.
Figure 6:
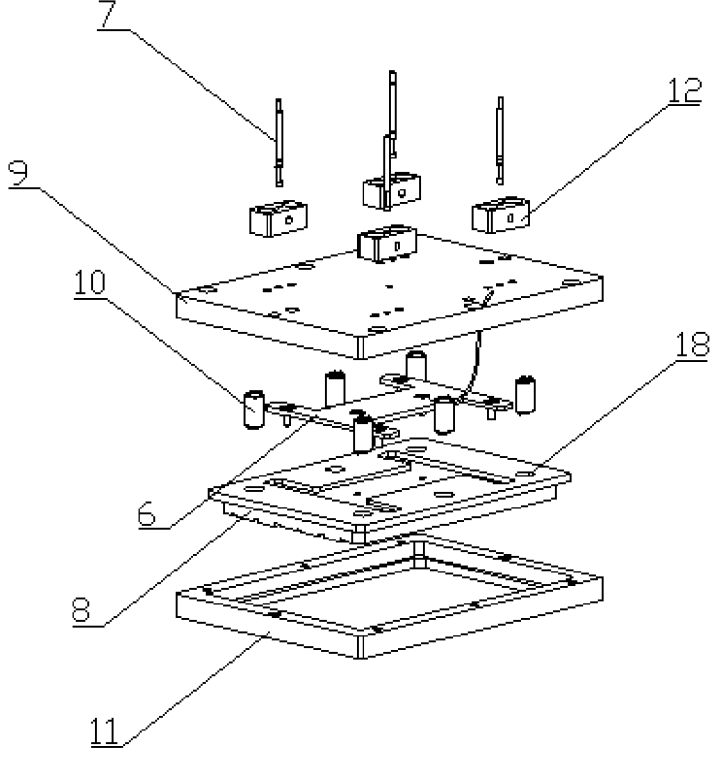
FIG. 6 is a three-dimensional assembly diagram of a testing mechanism provided by an embodiment of the present disclosure.

In one possible embodiment, reference is made to FIGS. 4-6, which show a structural diagram of one testing mechanism provided by the embodiment of the present disclosure, a structural diagram of another testing mechanism, and a three-dimensional assembly drawing of a testing mechanism. The testing mechanism 5 also comprises a second conductive element 7, which is arranged opposite the first conductive element 6 in the vertical direction, the first conductive element 6 is closer to the conveying mechanism 1 than the second conductive element 7, and the second conductive element 7 is arranged in series with the working circuit; the second conductive element 7 is used to separate from the first conductive element 6 when the first conductive element 6 is in the first position, so that the first conductive element 6 is disconnected from the working circuit; the second conductive element 7 is also used to contact the first conductive element 6 when the first conductive element 6 is in the second position, so that the first conductive element 6 is connected to the working circuit. Specifically, according to the conventional placement of the testing equipment, the location of the second conductive element 7 is higher than the location of the first conductive element 6. The first conductive element 6 and the second conductive element 7 are arranged in series on the working circuit of the container pushing device 3. The contact or lack thereof between the first conductive element 6 and the second conductive element 7 controls the on-off switching of the working circuit of the container pushing device 3. The second location is higher than the first location. When a standard-height container to be tested 2 passes by the first conductive element 6 is in the first location, disconnected from the second conductive element 7, and the working circuit of the container pushing device 3 is in the non-conductive state; when the container to be tested 2 that exceeds the standard height passes through the testing mechanism 5, the first conductive element 6 is moved to the second location by the vertical upward thrust provided by the container to be tested 2 and contacts the second conductive element 7, and the working circuit of the container pushing device 3 is in the conductive state. The second location varies depending on the over-highness of the container to be tested 2, so that according to the usual placement of the testing equipment, the side of the second conductive element 7 that is close to the first conductive element 6 is retractable, so that its lower surface can move within the range of the second location.

The testing mechanism 5 further comprises a first insulating board 8 and a second insulating board 9 disposed opposite to each other in the vertical direction, the first conductive element 6 is disposed on the side of the first insulating board 8 near the second insulating board 9, the second conductive element 7 is disposed on the side of the second insulating board 9 near the first insulating board 8, and the first insulating board 8 is slidably connected to the second insulating board 9. Specifically, the first insulation board 8 and the second insulation board 9 are horizontally disposed above the conveying mechanism 1, and the first insulation board 8 is close to the conveying mechanism 1 with respect to the second insulation board 9; the horizontal cross-section of the first conductive element 6 is smaller than the horizontal cross-section of the first insulation board 8, and the horizontal cross-section of the second conductive element 7 is smaller than the horizontal cross-section of the second insulation board 9. Specifically, the first insulation board 8 and the second insulation board 9 are used to construct an insulating environment for the first conductive element 6 and the second conductive element 7 such that the first conductive element 6 and the second conductive element 7 must conduct the working circuits of the container pushing device 3 by direct contact. Specifically, the second conductive element 7 is at least partially provided on the side of the second insulation board 9 proximate to the first insulation board 8, which is sufficient to form a conductive path with the first conductive element 6 at the second location.

Specifically, in the present disclosure, the first conductive element 6 and the second conductive element 7 are set in series on the working circuit of the container pushing device 3, and the contact or not of the first conductive element 6 and the second conductive element 7 is used to control the on-off of the working circuit of the container pushing device 3, so as to realize the automatic rejection of the containers to be tested 2 which are in excess of a standard height; the first insulating board 8 and the second insulating board 9 are arranged on the outside of the first conducive element 6 and the second conducive element 7, creating an insulating environment for the first conducive element 6 and the second conducive element 7, so that the first conducive element 6 and the second conducive element 7 must be in direct contact in order to conduct the working circuit of the container pushing device 3, which improves the accuracy of the container detection.

In some possible embodiments, the second insulation board 9 comprises guide grooves 11 provided in a vertical direction. Specifically, the guide grooves 11 may be provided in a perimeter type or in an opposing type. The first insulation board 8 is snap-fit with the guide groove 11 to allow the first insulation board 8 to slide along the guide groove 11. Specifically, in the horizontal direction, the width of the holding space of the guide groove 11 matches the size of the first insulation board 8 to enable the first insulation board 8 to slide only in the vertical direction; in the vertical direction, the guide groove 11 is further provided with a limiting portion to limit the distance at which the first insulation board 8 slides; specifically, the limiting portion comprises an upper limiting portion and a lower limiting portion provided in the vertical direction, and in accordance with the testing equipment's conventional placement, when the first insulation board 8 is in contact with the lower limit portion, the location of the first conductive element 6 is the first location, and when the first insulation board 8 is out of contact with the lower limit portion, the location of the first conductive element 6 is the second location. Specifically, during the process of the first insulation board 8 sliding from a position where it is out of contact with the lower limit position to a position where it is in contact with the upper limit position, and ignoring the permissible error in the height of the difference between the lowest point of the second position and the first position relative to the standard height, the range of change in the location of the first conductive element 6 is the range of change in the second position, i.e., the range of movement of the lower surface of the second conductive element 7, so that the distance between the upper and lower limit positions of the guide groove 11 matches the distance that the second conductive element 7 can be extended in the vertical direction. In some possible embodiments, the guide groove 11 is provided along the periphery of the first insulation board 8.

Specifically, in the present disclosure embodiment, the direction of movement and the range of movement of the first insulation board 8 are restricted by providing the guide groove 11 in the vertical direction to enable the first insulation board 8 to drive the first conductive element 6 to move between the first location and the second location, so as to control the on and off of the working circuit of the container pushing device 3.

In some possible embodiments, at least one of the first conductive element 6 and the second conductive element 7 is an elastically conductive element, the elastically conductive element is used to deform in the vertical direction to avoid the first conductive element 6 and the second conductive element 7 from damaging each other when they come into contact. Exemplarily, the retractable conductive element is provided with a spring, and the spring deforms under an external force to drive the retraction of the conductive element.

In some possible embodiments, the second conductive element 7 is an elastic conductive element. Specifically, the second conductive element 7 is fixedly disposed on the side of the second insulation board 9 near the first insulation board 8.

Figure 7:
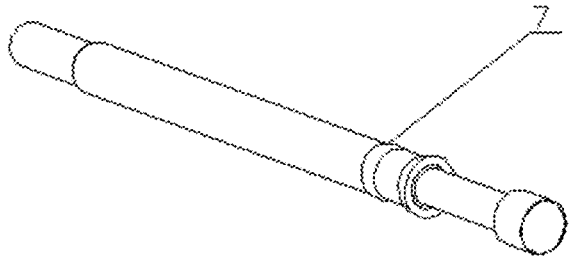
FIG. 7 is a schematic diagram of the structure of a probe provided by an embodiment of the present disclosure.

In some possible embodiments, the second conductive element 7 comprises at least one probe. Specifically, reference is made to FIG. 7, which shows a structural diagram of a probe provided in an embodiment of the present disclosure, the probe is provided with a spring, one end of the probe is retractable, the probe is arranged in a vertical direction, and the retractable end of the probe faces the first conductive element 6.

A second insulation board 9 is provided with a corresponding probe holder 12 for the probe, and the probe is fixed in the probe holder 12 in a vertical direction so that one end of the probe faces the first conductive element 6. In some specific embodiments, the number of probe holders 12 can be set to 4, evenly distributed on the second insulation board 9 and, accordingly, the number of probes is also set to 4, with each probe is fixed in the corresponding probe holder 12 in the vertical direction. In some specific embodiments, the probes can be arranged through the probe holders 12. The probe holders 12 can be separate components or can be connection points, soldering points, etc.

In some possible embodiments, in order to achieve more accurate detection, multiple probes can be set up, and the multiple probes are uniformly distributed relative to the first conductive element 6. The multiple probes are connected in parallel to each other on the working circuit of the container pushing device 3. The contact between the first conductive element 6 and any probe can conduct the working circuit of the container pushing device 3 to facilitate batch testing of the container to be tested 2, and any container to be tested 2 in the same batch that exceeding a standard height can cause the first conductive element 6 to come into contact with the nearest probe, thereby conducting the working circuit of the container pushing device 3.

The first conductive element 6 is a conductive board, the probes are provided in a plurality, the distribution of each probe corresponding to the probe holder 12 on the second insulation board 9 matches the shape of the conductive board, and the distance between each probe and the first conductive element 6 in the vertical direction is consistent. Specifically, the conductive board is horizontally disposed on the first insulation board 8, and the lower surfaces of the plurality of probes are in the same horizontal plane to make the distance of each probe from the conductive board in the vertical direction consistent. The probe holder 12 is uniformly distributed with respect to the conductive board to make the plurality of probes uniformly distributed with respect to the conductive board.

Specifically, in the present disclosure, the first conductive element 6 is configured as a horizontally-placed conductive plate, and multiple probe holders 12 are arranged uniformly relative to the conductive plate, so that the multiple probes are uniformly distributed relative to the conductive plate, to facilitate batch testing of the containers to be tested. If any container to be tested in the same batch exceeds a standard height, the conductive plate can come into contact with the nearest probe, thereby turning on the working circuit of the container pushing device 3.

In possible embodiments, the container testing equipment further comprises a bracket 13, the bracket 13 is provided on the conveying mechanism 1, the second insulation board 9 is slidably connected to the bracket 13, the second insulation board 9 is used to slide in a vertical direction relative to the bracket 13. Specifically, the bracket 13 forms a channel in a first direction to enable the container to be tested 2 to pass through, and the bracket 13 forms a channel in a second direction to enable the container pushing device 3 to push the container to be tested 2 into the container holding device 4; the second insulation board 9 is slidably connected to the bracket 13, a power output end of the drive mechanism is connected to the second insulation board 9, and the drive mechanism drives the second insulation plate 9 drives the testing mechanism 5 to move from an initial position to a preset location, and then from the preset location back to the initial position.

Specifically, in the present disclosure, the second insulation board 9 is provided on the conveying mechanism 1 by means of the bracket 13, and the second insulation board 9 is used to slide in the vertical direction relative to the bracket 13, driving the testing mechanism 5 to slide in the vertical direction, so as to facilitate the adjustment of the location of the testing mechanism 5 in accordance with a standard height of the container to be tested 2, and thus be able to adapt to the container to be tested 2 of different standard heights.

In some possible embodiments, the drive mechanism comprises a first sensor 14 and a drive motor 15, the first sensor 14 is electrically connected to the drive motor 15; the first sensor 14 is provided close to the testing mechanism 5 for sending a signal to a control circuit of the drive motor 15 when the container to be tested 2 is detected to control the drive motor 15 to operate. Specifically, the first sensor 14 may be disposed at the conveying mechanism 1 or at the bracket 13. Specifically, the first sensor 14 is disposed close to the testing mechanism 5 and away from a starting location of the container to be tested 2 on the conveying mechanism 1 so that when the container to be tested 2 is completely between the testing mechanism 5 and the conveying mechanism 1, the first sensor 14 sends a signal to control the drive motor 15 to work, and the drive motor 15 drives the testing mechanism 5 to a predetermined location for testing the container to be tested 2. In some specific embodiments, the setting position of the first sensing device 14 may not be restricted, and the delay of signal sending or the delay of the drive motor 15 controlling the testing mechanism 5 may be set according to the position of the first sensing device 14 relative to the testing mechanism 5 to achieve the same effect.

The drive motor 15 is provided on the bracket 13, and the drive motor 15 is located away from the conveying mechanism 1 with respect to the testing mechanism 5 for driving the second insulation board 9 to slide in a vertical direction with respect to the bracket 13. Specifically, the power output direction of the drive motor 15 is in a direction toward the testing mechanism 5, and the power output end of the drive motor 15, i.e., the drive rod, is connected to the second insulation board 9 for driving the testing mechanism 5 from an initial position to a predetermined position, and then from the predetermined position back to the initial position.

Specifically, in the present disclosure, the first sensor 14 is set to work in conjunction with the driving motor 15, so that when the container to be tested 2 is completely between the testing mechanism 5 and the conveying mechanism 1, the first sensor 14 sends a signal to control the driving motor 15 to work, and the driving motor 15 drives the testing mechanism 5 to a predetermined location for testing the container to be tested 2 to realize the automated testing of the container to be tested 2.

In possible embodiments, the second insulation board 9 is further provided with at least one guide element 16; the guide element 16 is slidably connected to the bracket 13, and the sliding direction of the guide element 16 is in a vertical direction. In some specific embodiments, the drive motor 15 drives the second insulation board 9 in motion, and the guide element 16 on the second insulation board 9 slides in the vertical direction with respect to the bracket 13. In some specific embodiments, the bracket 13 is provided with an auxiliary sliding member, the auxiliary sliding member is provided with a sliding groove along the vertical direction, and the guide element 16 is provided in the sliding groove to restrict the movement of the guide element 16 along the vertical direction. Exemplarily, the number of guide elements 16 may be set to 2, symmetrically provided with respect to both sides of the drive rod of the drive motor 15.

Specifically, in the present disclosure, the at least one guide element 16 and the drive motor 15 are uniformly distributed on the bracket 13 to play a balancing role, so as to make the force exerted by the drive motor 15 on the testing mechanism 5 always remain in the vertical direction, so as to make the respective conductive elements and the respective insulating boards of the testing mechanism 5 always remain in a horizontal state, and to improve the accuracy of the testing of the container.

In some possible embodiments, the bracket 13 is further provided with a second sensor 19, and at least one guide element 16 is provided with a limit device 20, the limit device 20 is used to mechanically limit the limit position of the guide element 16; the second sensor 19 is used for testing the position of the limit device 20 in the vertical direction, so as to obtain the position of the guide element 16 in the vertical direction. Specifically, the movement range of the guide element 16, i.e., the driving range of the drive motor

15, can be limited according to the standard height of the container to be tested 2, and the output signal of the second sensor 19. Specifically, the limit device 20 is provided with a sensing piece, which can cooperate with the second sensor 19 provided on the bracket 13 to identify the home position of sensing, so as to facilitate the host computer to calibrate the home position of the drive motor.

Figure 8:
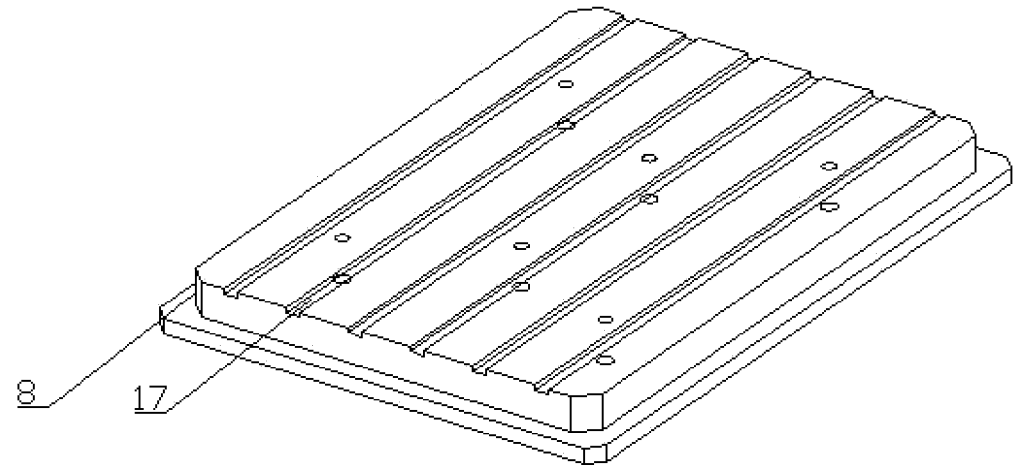
FIG. 8 is a schematic diagram of a structure of a first insulating board provided by an embodiment of the present disclosure.

In one possible embodiment, a breathable structure 17 is provided on the first insulation board 8. Specifically, reference is made to FIG. 8, which shows a structural diagram of a first insulation board provided in the embodiment of the present disclosure, the breathable structure 17 can be provided with multiple grooves, so that when the first insulation board 8 contacts the container to be tested 2, incomplete contact is formed, and air can pass through the contact surface between the two through the breathable structure 17, thereby avoiding adsorption.

Specifically, in the present disclosure, by providing a breathable structure 17 on the first insulating board 8, it is avoided that if the container to be tested 2 exceeds a standard height when the testing mechanism 5 is working, the contact between the first insulating board 8 and the container to be tested 2 forms an adsorptive force, and the container to be tested 2 is adsorbed with the first insulating board 8, which affects the testing equipment to continue working.

In some possible embodiments, an elastic element 10 is provided between the first insulation board and the second insulation board, at least one elastic element 10 is provided between the first insulation board 8 and the second insulation board 9, the first insulation board 8 is provided with grooves 18 corresponding to the elastic element 10, and the second insulation board 9 is provided with grooves 18 corresponding to the elastic element 10, the grooves 18 having a shape matching the shape of the elastic element 10; one end of the elastic element 10 is accommodated in a corresponding groove 18 on the first insulation board 8, the other end of the elastic element 10 is accommodated in a corresponding groove 18 on the second insulation board 9.

In some possible embodiments, the number of elastic elements 10 is a plurality of elastic elements, the first insulation board 8 is provided with grooves 18 corresponding to the plurality of elastic elements 10, the second insulation board 9 is provided with grooves 18 corresponding to the plurality of elastic elements 10, and the shapes of the grooves 18 are matched with the shapes of the elastic elements 10; one end of each of the elastic elements 10 is accommodated in a corresponding groove 18 on the first insulation board 8, and the other end of each elastic element 10 is accommodated in the corresponding groove 18 on the second insulation board 9. Specifically, in the horizontal direction, the plurality of elastic elements 10 are uniformly distributed between the first conductive element 6 and the second conductive element 7, staggered from the first conductive element 6 and the second conductive element 7, respectively, and the grooves 18 on the first insulation board 8 and the second insulation board 9 are arranged in accordance with the corresponding positions.

Exemplarily, the elastic element 10 may be provided as a spring, and the number of elastic elements 10 may be provided as 6. The elastic element 10 cannot have a connection relationship with both the first conductive element 6 and the second conductive element 7. Specifically, the elastic element 10 may have a connection relationship with the first conductive element 6, or the elastic element 10 may have a connection relationship with the second conductive element 7, or the elastic element 10 may not have a connection relationship with either of the first conductive element 6 or the second conductive element 7.

Specifically, in the present disclosure, the ends of each elastic element 10 are placed in the corresponding grooves 18 of the first insulation board 8, the second insulation board 9, respectively, so that the contact between the first conductive element 6 and the second conductive element 7 is not restricted by the length of the elastic element 10 when it is pressed, preventing that the first conductive element 6 and the second conductive element 7 cannot be contacted due to the elastic element 10 and thus the testing equipment is unable to remove the container 2 that exceeds a standard height of the container to be tested 2 to be rejected.

In order to facilitate the understanding of the technical solution of the present disclosure, the following is a detailed description of the working process of the container testing equipment provided in the embodiment of the present disclosure, using FIGS. 9 to 12 as an example.

Figure 9:
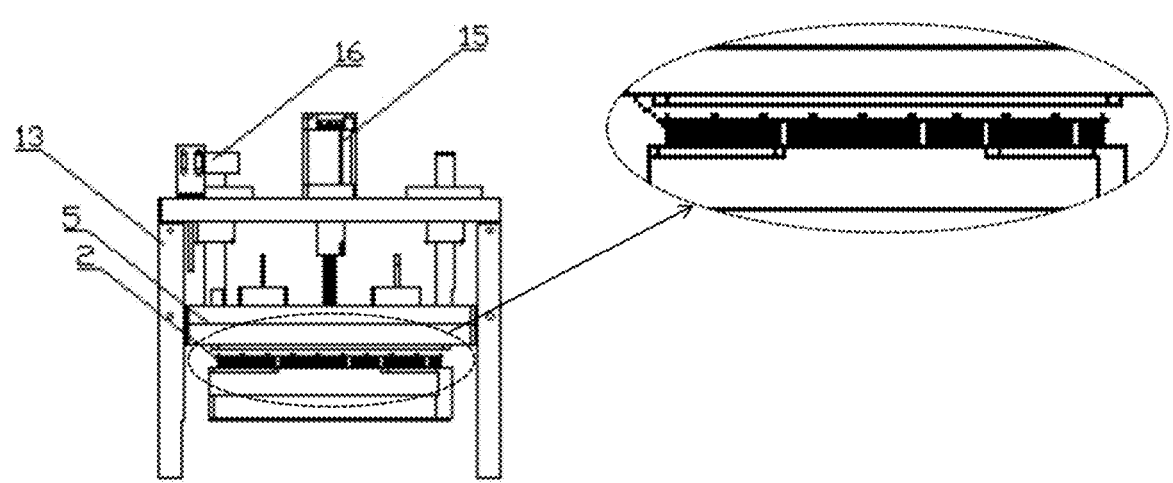
FIG. 9 is a schematic diagram of a local structure of a container testing equipment provided by an embodiment of the present disclosure when a container to be tested conforms to a standard height.
Figure 10:
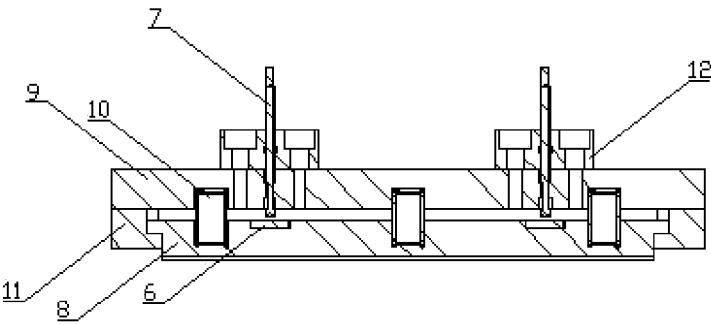
FIG. 10 is a schematic diagram of a structure of a testing mechanism when a container to be tested conforms to a standard height provided by an embodiment of the present disclosure.

Reference is made to FIGS. 9-10, which show a schematic diagram of the local structure of the container testing equipment when the container to be tested provided by the present embodiment is at standard height, and a schematic diagram of the structure of the testing mechanism when the container to be tested is at standard height. Specifically, according to the conventional placement of the testing equipment, the conveying mechanism 1 transports the container to be tested 2 along the first direction to below the testing mechanism 5. The first sensor 14 detects the container to be tested 2 and sends a signal to the control circuit of the drive motor 15 to control the drive motor 15 to operate, and the drive motor 15 drives the testing mechanism 5 to move to a predetermined position so that the first conductive element 6 is in the first location. If the container to be tested 2 is of standard height, the container to be tested 2 will not come into contact with the testing mechanism 5, the first conductive element 6 remains in the first location, separated from the second conductive element 7, the working circuit of the container pushing device 3 remains de-energized, and the conveying mechanism 1 continues to convey the container to be tested 2 in the first direction.

Figure 11:
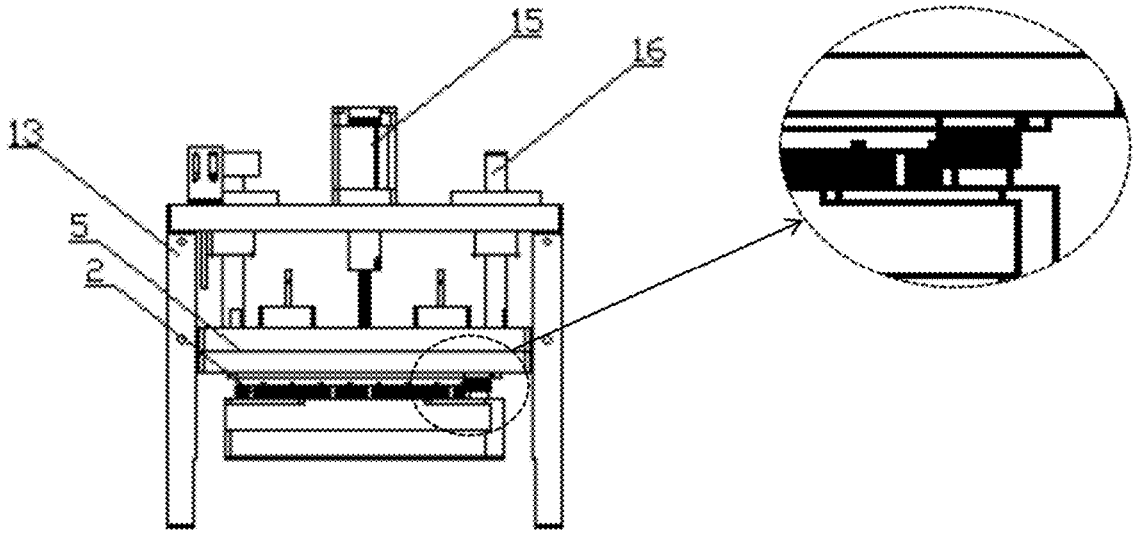
FIG. 11 is a schematic diagram of a local structure of a container testing equipment provided by an embodiment of the present disclosure when a container to be tested exceeds a standard height.
Figure 12:
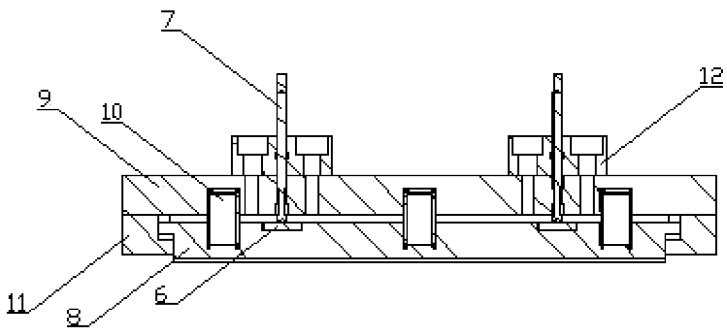
FIG. 12 is a schematic diagram of the structure of the testing mechanism provided by an embodiment of the present disclosure when the container to be tested exceeds a standard height.

Reference is made to FIGS. 11-12, which show a schematic diagram of the local structure of the container testing equipment when the container to be tested provided by the present embodiment exceeds the standard height, and a schematic diagram of the structure of the testing mechanism when the container to be tested exceeds the standard height. Specifically, according to the conventional placement of the testing equipment, the conveying mechanism 1 transports the container to be tested 2 along the first direction to below the testing mechanism 5. The first sensor 14 detects the container to be tested 2 and sends a signal to the control circuit of the drive motor 15 to control the drive motor 15 to operate, and the drive motor 15 drives the testing mechanism 5 to move to the preset location. If the container to be tested 2 exceeds the standard height, the container to be tested pushes the first insulation board 8, which drives the first conductive element 6 to the second location, where it makes contact with the second conductive element 7. The working circuit of the container pushing device 3 is then activated, pushing the container to be tested into the container holding device 4.

In summary, the container testing equipment of the present disclosure, a conveying mechanism, and a rejection mechanism, a testing mechanism, and a drive mechanism disposed on the conveying mechanism; the rejection mechanism comprises a container pushing device and a container holding device, the container pushing device is used to push containers to be tested on the conveying device into the container holding device when the working circuit is in a conduction state; a first conductive element of the testing mechanism is serially connected to the working circuit of the container pushing device, the first conductive element is used to move between the first position and the second position when the testing mechanism is in a predetermined position to control the on-off of the working circuit of the container pushing device, the first position is connected to the container to be tested when the testing mechanism is in a predetermined position to control the on-off of the working circuit of the container pushing device, and the first position is connected to the container to be tested when the testing mechanism is in a predetermined position. The first conductive element of the testing mechanism is set in series on the working circuit of the container pushing device, and the first conductive element is used to move between the first position and the second position when the testing mechanism is located in a predetermined position, so as to control the on/off switching of the working circuit of the container pushing device, and the first position of the testing mechanism is located in the predetermined position to match a standard height of the container to be tested; the drive mechanism is used to drive the testing mechanism to the predetermined position. At work, if the container to be tested does not exceed the standard height, the first conductive element and the working circuit of the container pushing device remain disconnected, and the container to be tested continues to be conveyed by the conveying mechanism; if the container to be tested exceeds the standard height, the container to be tested provides a vertical upward thrust to the first conductive element, which causes the first conductive element to be connected with the working circuit of the container pushing device, and the working circuit conducts, and the container pushing device pushes the container to be tested into the container holding device. The automatic rejection of containers exceeding a standard height is realized, the efficiency and accuracy of container testing are improved, and the possibility of damage to the analyzing instrument due to over-high containers is greatly reduced.

In the present disclosure, unless otherwise expressly specified and limited, the terms "connected", "connect" and the like are to be understood in a broad sense, for example, as a fixed connection, a detachable connection or a one-piece connection, a mechanical connection or an electrical connection; It may be a direct connection or an indirect connection through an intermediate medium, a connection within two elements or an interaction between two elements. For those skilled in the art, the specific meanings of the above terms in the present disclosure may be understood according to the specific circumstances.

It should be noted that the order of the above embodiments of the present disclosure is for description purposes only, and does not indicate any preference. While the above specification describes certain embodiments, other embodiments are also within the scope of the appended Claims. In some cases, the actions or steps recited in the Claims can be performed in a different order in the embodiments and still achieve the intended results. In addition, the processes depicted in the drawings do not necessarily require a specific sequence or be performed in a connected sequence to achieve the intended results, and in some embodiments, parallel processing of multiple tasks is also possible or may be advantageous.

The embodiments in this specification are described in a progressive manner. The similar parts of different embodiments can be cross-referenced, and each embodiment focuses on the differences with other embodiments.

The above mentioned are only better embodiments of the present disclosure, and are not intended to limit the present disclosure, and any modifications, equivalent substitutions, improvements, etc. made within the spirit and principles of the present disclosure shall be included in the scope of protection of the present disclosure.

What is claimed is:

1. A container testing equipment, comprising:
a conveying mechanism, used for conveying the container to be tested in a first direction;
a rejection mechanism, arranged on the conveying mechanism, wherein the rejection mechanism comprises a container pushing device and a container holding device; the container pushing device and the container holding device are arranged opposite each other on both sides of the conveying mechanism in a second direction; the second direction intersects the first direction; the container pushing device is used to push the container to be tested on the conveying mechanism into the container holding device when a working circuit is in conductive state;
a testing mechanism, arranged on the conveying mechanism, wherein the testing mechanism comprises a first conductive element, which is arranged in series in the working circuit of the container pushing device, and is used to move the testing mechanism between a first position and a second position when the testing mechanism is in a predetermined position; the first position of the testing mechanism matches a standard height of the container to be tested when in the predetermined position; a distance between the first position and the conveying mechanism in a vertical direction is less than a distance between the second position and the conveying mechanism in the vertical direction; the first position is used to disconnect the first conductive element from the working circuit with the working circuit in a non-conductive state; the second position is used to connect the first conductive element to the working circuit with the working circuit in a conductive state;
a driving mechanism, arranged on the conveying mechanism, wherein the driving mechanism is used to drive the testing mechanism to the predetermined position,
wherein the testing mechanism further comprises a second conductive element, which is arranged opposite the first conductive element in the vertical direction, the first conductive element is arranged closer to the conveying mechanism in relation to the second conductive element, and the second conductive element is arranged in series on the working circuit; the second conductive element is used to separate from the first conductive element when the first conductive element is in the first position, with the first conductive element disconnected from the working circuit; and the second conductive element is also used to contact the first conductive element when the first conductive element is in the second position, with the first conductive element connected to the working circuit,
wherein the testing mechanism further comprises a first insulating board and a second insulating board disposed opposite to each other in a vertical direction, the first conductive element is disposed on the side of the first insulating board closer to the second insulating board, the second conductive element is disposed on the side of the second insulating board closer to the first insulating board, and the first insulating board is slidably connected to the second insulating board; and a bracket, the bracket is provided on the conveying mechanism, the second insulating board for sliding in a vertical direction relative to the bracket, wherein the second insulating board is further provided with at least one guide element; the guide element is slidably connected to the bracket, and the sliding direction of the guide element is in a vertical direction, wherein the bracket is further provided with a first sensor, the at least one guide element is provided with a limit device, the first sensor is used for testing the position of the limit device in the vertical direction.

2. The equipment according to claim 1, wherein the second insulating board comprises a guide groove arranged in a vertical direction, and the first insulating board is engaged with the guide groove to allow the first insulating board to slide along the guide groove.

3. The equipment according to claim 1, wherein at least one conductive element of the first conductive element and the second conductive element is an elastically conductive element, the elastically conductive element is used to deform in the vertical direction.

4. The equipment according to claim 3, wherein the second conductive element is an elastic conductive element.

5. The equipment according to claim 4, wherein the second conductive element comprises at least one probe; the second insulating board is provided with a probe holder corresponding to the at least one probe, and the at least one probe is fixed to the probe holder in a vertical direction with one end of the at least one probe facing the first conductive element.

6. The equipment according to claim 5, wherein the first conductive element is a conductive board, a plurality of probes are provided, with a distribution of the plurality of probes corresponding to probe holders on the second insulating board matching a shape of the conductive board, and the distances between each of the plurality of probes and the first conductive element in the vertical direction are consistent.

7. The equipment according to claim 1, wherein the driving mechanism comprises a second sensor and a drive motor, the second sensor is electrically connected to the drive motor;

the second sensor is provided closer to the testing mechanism for sending a signal to a control circuit of the drive motor when the container to be tested is detected to control an operation of the drive motor; and the drive motor is provided on the bracket, wherein the drive motor is remote from the conveying mechanism with respect to the testing mechanism, for driving the second insulating board to slide in a vertical direction relative to the bracket.

8. The equipment according to claim 1, wherein the first insulating board is provided with a breathable structure.

9. The equipment according to claim 1, wherein the first insulating board is provided with at least one elastic element between the first insulating board and the second insulating board, the first insulating board is provided with grooves corresponding to the elastic element, the second insulating board is provided with grooves corresponding to the elastic element, the grooves are shaped to match the shape of the elastic element; and one end of the elastic element is accommodated in a corresponding groove in the first insulating board and the other end of the elastic element is accommodated in a corresponding groove in the second insulating board.

10. A container testing equipment, comprising:

a conveying mechanism, used for conveying the container to be tested in a first direction;

a rejection mechanism, arranged on the conveying mechanism, wherein the rejection mechanism comprises a container pushing device and a container holding device; the container pushing device and the container holding device are arranged opposite each other on both sides of the conveying mechanism in a second direction; the second direction intersects the first direction; the container pushing device is used to push the container to be tested on the conveying mechanism into the container holding device when a working circuit is in conductive state;

a testing mechanism, arranged on the conveying mechanism, wherein the testing mechanism comprises a first conductive element, which is arranged in series in the working circuit of the container pushing device, and is used to move the testing mechanism between a first position and a second position when the testing mechanism is in a predetermined position; the first position of the testing mechanism matches a standard height of the container to be tested when in the predetermined position; a distance between the first position and the conveying mechanism in a vertical direction is less than a distance between the second position and the conveying mechanism in the vertical direction; the first position is used to disconnect the first conductive element from the working circuit with the working circuit in a non-conductive state; the second position is used to connect the first conductive element to the working circuit with the working circuit in a conductive state; and a driving mechanism, arranged on the conveying mechanism, wherein the driving mechanism is used to drive the testing mechanism to the predetermined position, wherein the testing mechanism further comprises a second conductive element, which is arranged opposite the first conductive element in the vertical direction, the first conductive element is arranged closer to the conveying mechanism in relation to the second conductive element, and the second conductive element is arranged in series on the working circuit; the second conductive element is used to separate from the first conductive element when the first conductive element is in the first position, with the first conductive element disconnected from the working circuit; and the second conductive element is also used to contact the first conductive element when the first conductive element is in the second position, with the first conductive element connected to the working circuit, wherein the testing mechanism further comprises a first insulating board and a second insulating board disposed opposite to each other in a vertical direction, the first conductive element is disposed on the side of the first insulating board closer to the second insulating board, the second conductive element is disposed on the side of the second insulating board closer to the first insulating board, and the first insulating board is slidably connected to the second insulating board, wherein the first insulating board is provided with at least one elastic element between the first insulating board and the second insulating board, the first insulating board is provided with grooves corresponding to the elastic element, the second insulating board is provided with grooves corresponding to the elastic element, the grooves are shaped to match the shape of the elastic element; and one end of the elastic element is accommodated in a corresponding groove in the first insulating board and the other end of the elastic element is accommodated in a corresponding groove in the second insulating board.

11. A container testing equipment, comprising:

a conveying mechanism, used for conveying the container to be tested in a first direction;

a rejection mechanism, arranged on the conveying mechanism, wherein the rejection mechanism comprises a container pushing device and a container holding device; the container pushing device and the container holding device are arranged opposite each other on both sides of the conveying mechanism in a second direction; the second direction intersects the first direction; the container pushing device is used to push the container to be tested on the conveying mechanism into the container holding device when a working circuit is in conductive state;

a testing mechanism, arranged on the conveying mechanism, wherein the testing mechanism comprises a first conductive element, which is arranged in series in the working circuit of the container pushing device, and is used to move the testing mechanism between a first position and a second position when the testing mechanism is in a predetermined position; the first position of the testing mechanism matches a standard height of the container to be tested when in the predetermined position; a distance between the first position and the conveying mechanism in a vertical direction is less than a distance between the second position and the conveying mechanism in the vertical direction; the first position is used to disconnect the first conductive element from the working circuit with the working circuit in a non-conductive state; the second position is used to connect the first conductive element to the working circuit with the working circuit in a conductive state;

a driving mechanism, arranged on the conveying mechanism, wherein the driving mechanism is used to drive the testing mechanism to the predetermined position, wherein the testing mechanism further comprises a second conductive element, which is arranged opposite the first conductive element in the vertical direction, the first conductive element is arranged closer to the conveying mechanism in relation to the second conductive element, and the second conductive element is arranged in series on the working circuit; the second conductive element is used to separate from the first conductive element when the first conductive element is in the first position, with the first conductive element disconnected from the working circuit; and the second conductive element is also used to contact the first conductive element when the first conductive element is in the second position, with the first conductive element connected to the working circuit, wherein the testing mechanism further comprises a first insulating board and a second insulating board disposed opposite to each other in a vertical direction, the first conductive element is disposed on the side of the first insulating board closer to the second insulating board, the second conductive element is disposed on the side of the second insulating board closer to the first insulating board, and the first insulating board is slidably connected to the second insulating board;

a bracket, the bracket is provided on the conveying mechanism, the second insulating board for sliding in a vertical direction relative to the bracket, wherein the driving mechanism comprises a sensor and a drive motor, the sensor is electrically connected to the drive motor;

the sensor is provided closer to the testing mechanism for sending a signal to a control circuit of the drive motor when the container to be tested is detected to control an operation of the drive motor; and the drive motor is provided on the bracket, wherein the drive motor is remote from the conveying mechanism with respect to the testing mechanism, for driving the second insulating board to slide in a vertical direction relative to the bracket.

* * * * *